(12) United States Patent
Guo et al.

(10) Patent No.: US 6,947,771 B2
(45) Date of Patent: Sep. 20, 2005

(54) USER INTERFACE FOR A PORTABLE ELECTRONIC DEVICE

(75) Inventors: Jin Guo, Sunnyvale, CA (US); Charles Yimin Wu, Singapore (SG); Ying Chang, Palo Alto, CA (US); Victoria Lyustin, San Francisco, CA (US)

(73) Assignee: Motorola, Inc., Schaumburg, IL (US)

( * ) Notice: Subject to any disclaimer, the term of this patent is extended or adjusted under 35 U.S.C. 154(b) by 664 days.

(21) Appl. No.: 09/923,501

(22) Filed: Aug. 6, 2001

(65) Prior Publication Data

US 2003/0027601 A1 Feb. 6, 2003

(51) Int. Cl.⁷ .................................. H04B 1/38
(52) U.S. Cl. ................ 455/566; 455/550.1; 455/575.1; 455/90.3; 345/168; 345/171
(58) Field of Search .................. 455/566, 90.3, 455/575.1, 550.1; 345/168, 171, 170, 172

(56) References Cited

U.S. PATENT DOCUMENTS

| | | | | | |
|---|---|---|---|---|---|
| 4,505,602 | A | * | 3/1985 | Wong | 400/110 |
| 4,684,926 | A | * | 8/1987 | Yong-Min | 341/28 |
| 4,872,196 | A | * | 10/1989 | Royer et al. | 455/564 |
| 4,879,653 | A | * | 11/1989 | Shinoto | 715/535 |
| 4,954,955 | A | * | 9/1990 | Chiu | 341/22 |
| 5,119,296 | A | * | 6/1992 | Zheng et al. | 715/535 |
| 5,790,055 | A | * | 8/1998 | Yu | 341/28 |
| 6,094,666 | A | * | 7/2000 | Li | 715/535 |
| 6,131,048 | A | * | 10/2000 | Sudo et al. | 455/566 |
| 6,351,657 | B2 | * | 2/2002 | Yamada | 455/566 |
| 6,356,258 | B1 | * | 3/2002 | Kato et al. | 345/168 |
| 6,636,163 | B1 | * | 10/2003 | Hsieh | 341/28 |
| 6,766,179 | B1 | * | 7/2004 | Shiau et al. | 455/566 |
| 2001/0006904 | A1 | * | 7/2001 | Cha | 455/566 |

FOREIGN PATENT DOCUMENTS

| | | |
|---|---|---|
| CN | 1015214 B | 12/1991 |
| CN | 1092186 A | 9/1994 |
| CN | 1029760 C | 9/1995 |
| CN | 1120695 A | 4/1996 |
| CN | 1121601 A | 5/1996 |
| CN | 1133450 A | 10/1996 |
| CN | 1142631 A | 2/1997 |
| CN | 1036548 C | 11/1997 |
| WO | WO90/02992 | 3/1990 |

\* cited by examiner

Primary Examiner—William Trost
Assistant Examiner—Sharad Rampuria
(74) Attorney, Agent, or Firm—Hisashi D. Watanabe (57) ABSTRACT

The present invention is a user interface (120) for an ideographic character input device (100) comprising three rows (148, 150, 152) of adjacent input keys. A first row (148) includes keys that represent linear character strokes, a third row (152) includes keys that represent non-linear character strokes, and the second row (154) includes keys that represent a linear character stroke, a non-linear character stroke and a dot. The user interface (120) may also function as a numeric keypad in which the first row (148) includes keys 1 through 3, the second row (150) includes keys 4 through 6 and the third row (152) includes keys 7 through 9. The three rows (148, 150, 152) include single stroke keys corresponding to individual character strokes used to form a particular ideographic character. The user interface also includes at least one combination stroke key corresponding to a particular activation sequence of the single stroke keys used to form the ideographic character. A processor (512) of the device (100) is capable of forming the ideographic character, or a portion thereof, in two ways: upon selection of the particular activation sequence of the single stroke keys and upon selection of the combination stroke key. A display (118) is coupled to the processor (512) to display the ideographic character, or a portion thereof.

11 Claims, 7 Drawing Sheets

| KEY | IDENTIFIER | TYPE | DESCRIPTION | EXAMPLE |
|---|---|---|---|---|
| 1 | SUBSTANTIALLY HORIZONTAL COMPONENT | LINEAR CHARACTER STROKE | A HORIZONTAL LINE, DIRECTED TO THE RIGHT, WHICH MAY OR MAY NOT HAVE A SLOPE | HENG |
| 2 | SUBSTANTIALLY VERTICAL COMPONENT | LINEAR CHARACTER STROKE | A VERTICAL LINE, DIRECTED DOWNWARD, WHICH MAY OR MAY NOT HAVE A SLOPE | SHU |
| 3 | LEFTWARD SLANT COMPONENT | LINEAR CHARACTER STROKE | A SLIGHTLY-CURVED LINE DIRECTED DOWNWARD, AND TO THE LEFT | PIE |
| 4 | DOT COMPONENT | DOT STROKE | A DOT OR SHORT SEGMENT | DIAN |
| 5 | CLOCKWISE ANGULAR COMPONENT | NON-LINEAR CHARACTER STROKE | A FIRST SEGMENT IS DIRECTED TO THE RIGHT AND, FROM ONE END, A SECOND SEGMENT IS DIRECTED DOWNWARD | ZHE |
| 6 | RIGHTWARD SLANT COMPONENT | LINEAR CHARACTER STROKE | A SLIGHTLY-CURVED LINE DIRECTED DOWNWARD, AND TO THE RIGHT | NA |
| 7 | COUNTER-CLOCKWISE HOOK COMPONENT | NON-LINEAR CHARACTER STROKE | A FIRST SEGMENT IS DIRECTED DOWNWARD AND, AT ONE END, A SECOND SEGMENT FORMS A HOOK TO THE RIGHT | ZHUOGOU |
| 8 | COUNTER-CLOCKWISE ANGULAR COMPONENT | NON-LINEAR CHARACTER STROKE | A FIRST SEGMENT IS DIRECTED DOWNWARD AND, FROM ONE END, A SECOND SEGMENT IS DIRECTED TO THE RIGHT | ZHUOZHE |
| 9 | CLOCKWISE HOOK COMPONENT | NON-LINEAR CHARACTER STROKE | A FIRST SEGMENT IS DIRECTED DOWNWARD AND, AT ONE END, A SECOND SEGMENT FORMS A HOOK TO THE LEFT | YOUGOU |
| 0 | BOX | COMBINATION OF STROKES | AN ENCLOSED SHAPE HAVING FOUR LINEAR SIDES | KOU |

| KEY (410) | PRIMARY STOKE (412) | STROKE CATEGORIES — ALTERNATIVE STROKES (414) |
|---|---|---|
| 1 | — | ／ ` — ／ ∕ ` ⁻ |
| 2 | │ | ／ |
| 3 | ╱ | ） ⌒ ﹨ 」 ⁄ ʹ |
| 4 | ＼ | ／ ╱ ＼ ／ ∕ ╱ ＼ ＼ ／ |
| 5 | ⏋ | ⏋ ⏋ ⏋ ⏋ ⁊ З З ⏋ ⏋ |
| 6 | ＼ | ⏋ ⌐ |
| 7 | ⌐ | ⌐ ⌐ ⌐ ⌐ ⌐ L L ⌐ |
| 8 | ⟨ | L ⌐ L ⌐ ⌐ ⌐ ⟨ ⟨ ⌐ ⌐ ⌐ ⌐ L |
| 9 | ㄅ | ⏋ ⌐ ㄅ ⌐ ⌐ ⌐ З ⌐ |

USER INTERFACE FOR A PORTABLE ELECTRONIC DEVICE

FIELD OF THE INVENTION

The present invention relates to a keypad layout with strokes assigned to keys in a novel and convenient manner for input of ideographic text, such as Chinese, Japanese and other Asian languages.

BACKGROUND OF THE INVENTION

Developers of electronic devices have struggled with designing user interfaces for data entry of ideographic characters. Ideographic characters are commonly used for Asian languages, such as Chinese and Japanese. These Asian languages include a large quantity of ideographic characters, in excess of 13,000 characters. In contrast, a standard full-size alphabetic keyboard, such as a standard QWERTY keyboard, only has about 100 keys or so. It is quite challenging to design an electronic device that will permit a user to input the 13,000 or more characters of an Asian language using the limited quantity of keys of a standard full-size alphabetic keyboard.

The problems of designing a user interface for data entry of ideographic character in a portable electronic device are even more challenging. The increasing demand for small, handheld devices is driving keyboard design towards keypad data entry. A keypad typically has only 12 to 24 keys of which 10 keys are used for entering numbers 1 through 9 and 0. The keypad is typically used on telephones, mobile telephones and similar portable electronic devices. One hand of a user supports the device and the other hand accesses the user interface to enter data. It is more difficult to design a user interface for a portable electronic device, since there are far fewer input keys available for entry of ideographic characters.

Schemes of character entry using a 9-key or 10-key keypad have been proposed. Several of these schemes are based on entry of strokes and other character components. For example, Chinese Patent Applications No. CN1142631A and CN1120695A describe three categories of character components are mapped to keys on a keypad:—lines, corners and boxes. Whereas such a scheme is flexible, it does not have any inherent ergonomic efficiency, as there is no intuitive relationship between keys and character components. Also, in decoding key entry, it is a drawback that the user must enter not just 1 to 3 initiated strokes, but also 2 or 1 of the last strokes of a character. This requirement causes the user to have to think ahead to the last stroke of a character to enable complete character entry. It is believed that this requirement is improved or disambiguation because the selection of strokes and boxes inadequately spans the range of stroke components required for data entry and therefore inadvertently disambiguates strokes.

Also, U.S. patent application Ser. No. 09/220,308, filed on Dec. 23, 1998, assigned to the assignee of the present invention, describes a keypad for stroke-based ideographic text entry where each key has a clear and reasonably unambiguous stroke meaning. For this keypad, the selected strokes assigned to keys are capable of addressing the 13,000 or more characters of an Asian language. Also, the layout of the keypad provides a particular association between a key and its corresponding stroke. In particular, corner-shaped strokes are positioned at the corners of the keypad so that a user may locate them easily. In addition, the corner-shaped strokes are positioned in locations that predominantly correspond to the positions where they appear in the majority of characters that include these components. Further, the keys of the left-hand column represent strokes that predominate in left-hand portions of characters and radicals, and the keys of the right-hand column represent strokes that predominate in right-hand portions of characters and radicals. Although the above design of the user interface is effective, there is an opportunity to improve upon this design.

There is a need for an improved keypad for stroke-based ideographic text entry in which each key has a clear and reasonably unambiguous stroke meaning while being capable of addressing the 13,000 or more characters of an Asian language. In particular, there is a need for a keypad that separates character strokes in the differentiating groups so that a user may intuitively and quickly locate the character strokes. In addition, there is a need for one or more short-cut buttons for the more common character stroke combinations appearing in the majority of characters of an Asian language while continuing to allow the user to manually input the character stroke combinations, if he or she so chooses not to use the short-cut.

It is further desirable to have a keypad for stroke-based ideographic text entry that conforms to existing standards of Asian countries. For example, the National Quality Technology Monitoring Bureau of the Peoples Republic of China has published an "Information Technology Generic Specification For Chinese Character Input With Digital Keyboard" which was approved on Mar. 17, 2000 and became effective on Jul. 1, 2000. Section 4.4.1 of this publication sets forth the basic stroke key position settings for numeric keys 1 through 5 as follows: key 1 is the heng stroke, key 2 is the shu stroke, key 3 is the pie stroke, key 4 is the dian stroke and key 5 is the zhe stroke. The publication does not provide stroke key position settings for the other keys of the digital keyboard.

DETAILED DESCRIPTION OF THE PREFERRED EMBODIMENT(S)

The present invention is a user interface for a portable electronic device comprising three rows of input keys, namely a first row of input keys, a second row of input keys adjacent to the first row, and a third row of input keys adjacent to the second row. Each key of the first row represents a linear character stroke, and each key of the third row represents a non-linear character stroke. The second row includes one or more of each, namely at least one key representing a linear characters stroke and at least one key representing a non-linear character stroke. The user interface may also function as a numeric keypad in which input keys of the first row correspond to numbers 1 through 3, input keys of the second row correspond to numbers 4 through 6, and input keys of the third row correspond to numbers 7 through 9.

Also, the present invention is a portable electronic device for processing an ideographic character having at least one ideographic section. The portable electronic device comprises a keypad including a plurality of single stroke keys and one or more combination stroke keys, a processor coupled to the keypad and a display coupled to the processor. Each single stroke key of the plurality of signal stroke keys corresponds to an individual character stroke, and a particular combination stroke key of the one or more combination stroke keys corresponds to a particular sequence of the plurality of single stroke keys. The processor is capable of forming one or more ideographic sections upon selection of the particular sequence of the plurality of single stroke keys and forming the ideographic section(s) upon selection of the combination stroke key. The display shows the ideographic section(s).

The present invention is a user interface of a portable electronic device that provides for data entry of ideographic characters, particularly characters of Asian languages. The preferred embodiment, as shown in the drawings and described herein, is directed to a radiotelephone for wireless communication of voice and/or data signals and provides for data entry of Chinese characters. However, it is to be understood that the present invention may be used for any type of portable electronic device such as, but not limited to, a radiotelephone, paging device, computing device, handheld device, personal digital assistant, and the like. Although the present invention is particularly useful for Asian languages, such as Chinese, Japanese and Korean, it may also be used for other languages of the world that utilize ideographic characters.

Figure 1:
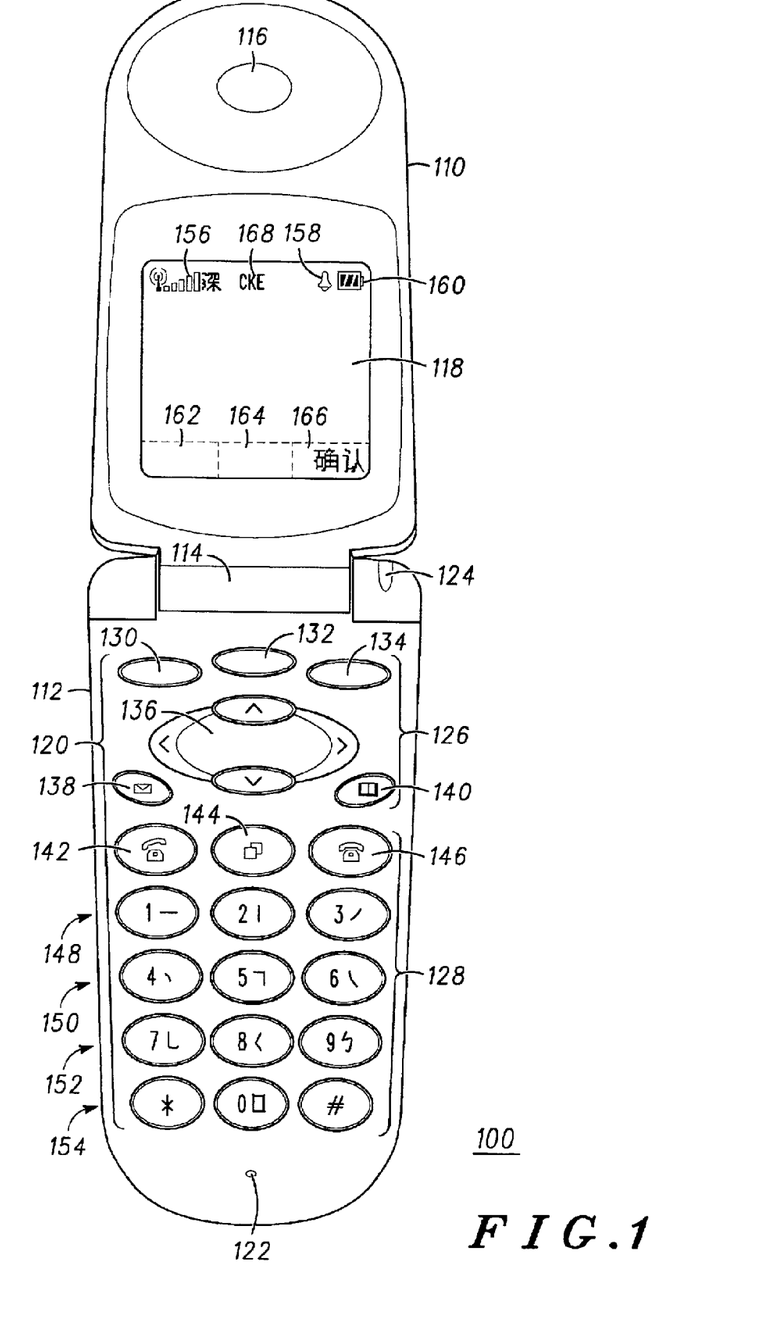
FIG. 1 is a front plan view of a preferred embodiment of the present invention.

Referring to FIG. 1, the preferred embodiment 100 is a foldable, portable electronic device having a top section 110 and a bottom section 112 movably joined to one end 114 of the top section. The top section 110 includes an earpiece aperture 116 and a display 118, the bottom section 112 includes a user interface 120, a microphone aperture 122, and a visual indicator 124. The preferred embodiment 100 also includes other components of a radiotelephone (not shown) that are generally known in the art, such as an antenna, battery pack, external connectors, additional controls, and the like.

The user interface 120 of the present invention includes function keys 126 and data entry keys 128. For the preferred embodiment 100 shown in FIG. 1, the function keys 126 are located at an upper portion of the bottom section and include menu selection keys 130, 132, 134, directional keys 136 (i.e., up, down, left and right), a message retrieval key 138, a memory key 140, a call answer key 142, a call termination key 144 and a clear function key 146. The function keys 126 of the present invention are not limited to those provided for the preferred embodiment 100 and may include other programmed or user-programmable control buttons such as volume control keys, voice recording keys, device setup controls, and the like. The data entry keys 128 of the preferred embodiment 100 are located at a lower portion of the bottom section and include ten numeric keys, namely keys "1" through "9" and "0", as well as a "*" key and a "#" key for a total of 12 keys. As shown in FIG. 1, the data entry keys comprise a matrix of four rows in which each row includes three keys, similar to a typical telephone keypad. A first row 148 is positioned at the top of the matrix, a second row 150 is positioned below the first row, a third row 152 is positioned below the second row, and a fourth row 154 is positioned below the third row at the bottom of the matrix. The first row 148 includes keys "1", "2" and "3" as shown on their respective surfaces, the second row 150 includes keys "4", "5" and "6" as shown on their respective surfaces, the third row 152 includes keys "7", "8" and "9" as shown on their respective surfaces, and the fourth row 154 includes keys "*", "0" and "#" as shown on their respective surfaces.

The data entry keys 128 of the present invention are also used to input individual character strokes and as well as numbers. As shown in FIG. 1, several keys of the data entry keys have character strokes shown to the right of their corresponding numbers. For the preferred embodiment 100, character strokes are shown on numeric keys "1" through "9". Accordingly, each key is used to input either a number or a character stroke, depending upon the input mode of the device. The input mode of the device may be determined by selection of one or more function keys. For example, a user may toggle between a number input mode and a character stroke input mode by pressing a particular menu selection key 130, 132, 134.

The display 118 of the device provides various types of information to the user. Certain indicators are provided for general operation of the device, such as the signal strength indicator 156, audio indicator 158 and power indicator 160 of the preferred embodiment 100. Other indicators are provided for operation of the menu selection keys 130, 132, 134 of the function keys. For example, as shown by the preferred embodiment 100 in FIG. 1, there are three menu selection keys 130, 132, 134 provided at the top of the upper portion of the bottom section 112. Also, a bottom area of the display 118 is reserved for one to three menu selection indicators 162, 164, 166 that correspond to one or more of the menu selection keys 130, 132, 134. As shown in FIG. 1, the right menu selection key 134 has a corresponding menu selection indicator 166, specifically Chinese characters representing the word "confirm". On the other hand, the left and middle menu selection keys 130, 132 do not have corresponding menu selection indicators shown in FIG. 1. Accordingly, activation of the right menu selection key 134 will initiate processing of any recent data entries, whereas activation of the left or middle menu selection keys 130, 132 will not perform any function. The preferred embodiment 100 also includes an input mode indicator 168 at the top mid-section of the display 118 for signifying the input mode of the device, such as the number input mode and the character stroke input mode described above. The input mode indicator 168 representing the character stroke input mode is shown in FIG. 1.

The data entry keys 128 of the present invention are also used to input at least one combination of individual character strokes (a.k.a., character stroke combination) and as well as the individual character strokes. Key "0" of the preferred embodiment 100 corresponds the following sequence of keys: first key "2", then key "5" and finally key "1". As shown in FIG. 1, key "0" includes a box component shown on its face to the right of the number "0". Accordingly, key "0" is used to input either the number "0"

or the combination of individual character strokes for keys "2", "5" and "1", depending upon the input mode of the device. As stated above, the input mode of the device may be determined by selection of one or more function keys 126.

Figure 2:
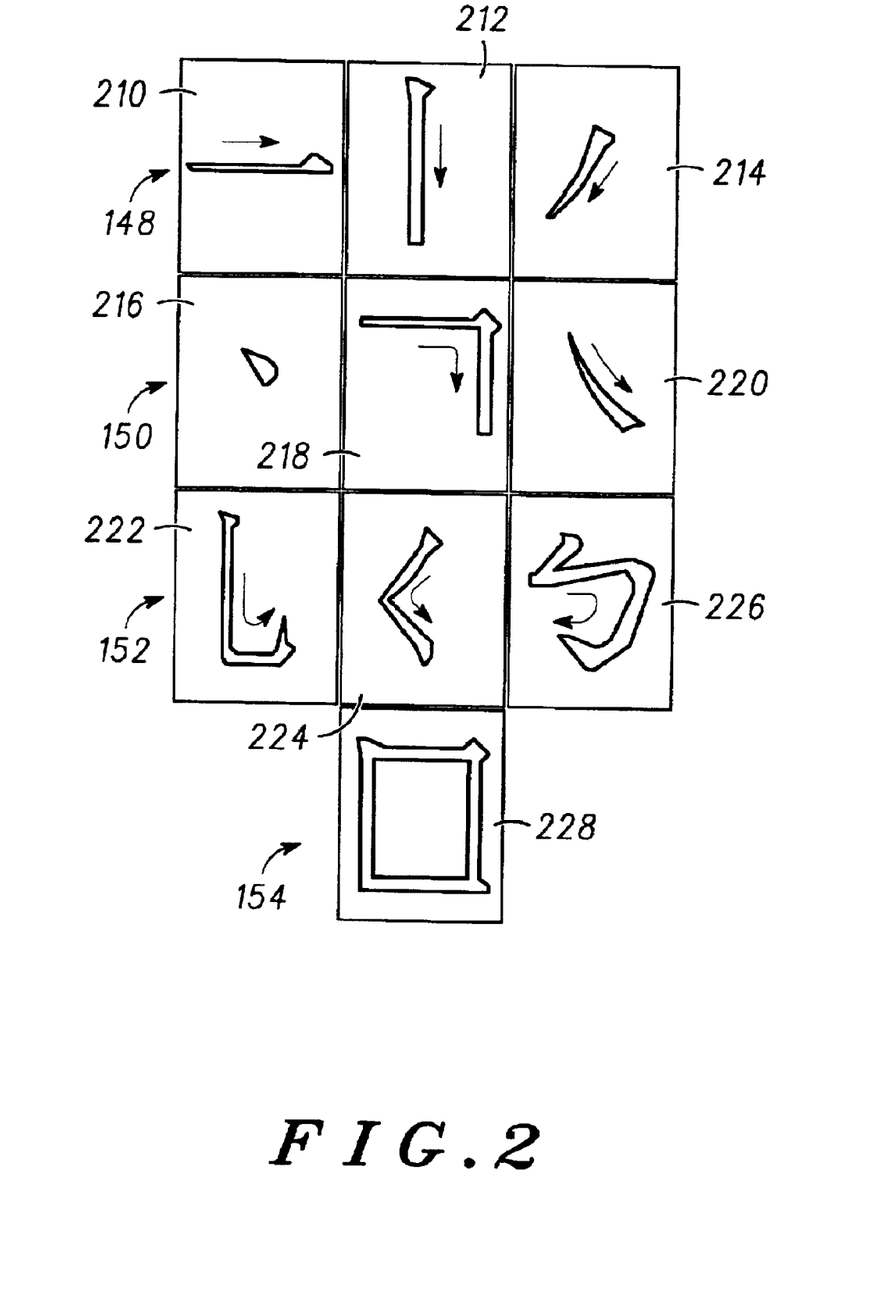
FIG. 2 is a diagrammatic view of a preferred keypad layout of the preferred embodiment shown in FIG. 1.
Figure 3:
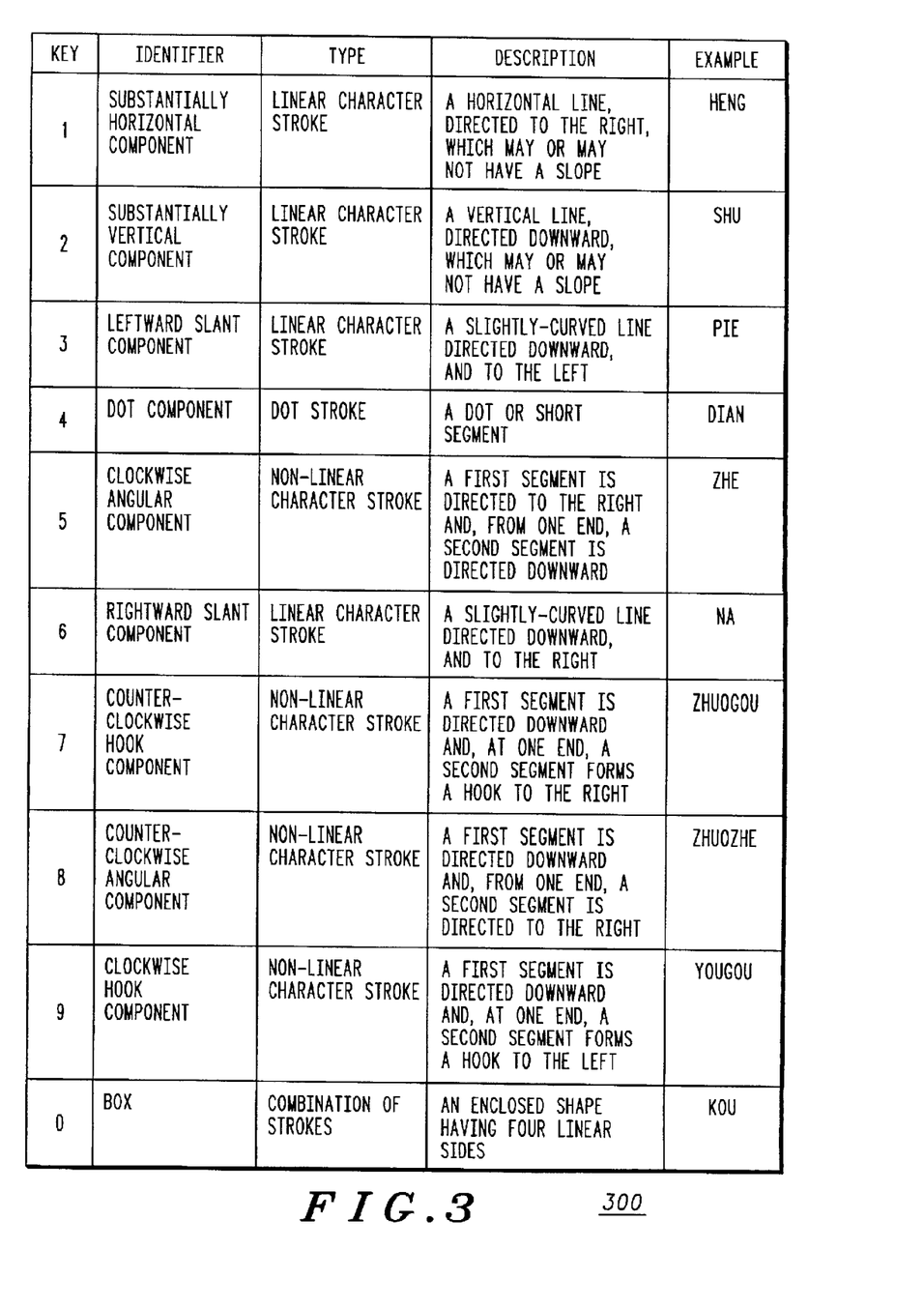
FIG. 3 is a table representing the nine individual character strokes and the one combination of character strokes shown in FIGS. 1 and 2 in which details and examples are provided.

FIG. 2 is an illustration representing the individual character strokes, i.e. keys "1" through "9", and the character stroke combination, i.e. key "0", shown in FIG. 1, and FIG. 3 shows a table 300 summarizing individual character strokes and character stroke combination shown in FIG. 2. In FIG. 2, the first row 148 includes a substantially horizontal component 210, a substantially vertical component 212, and a leftward slant component 214; the second row 150 includes a dot component 216, a clockwise angular component 218, and a rightward slant component 220; the third row 152 includes a counter-clockwise hook component 222, a counter-clockwise angular component 224, and a clockwise hook component 226; and the fourth row 154 includes a box component 228 positioned below the counter-clockwise angular component.

As shown in FIG. 3, all of individual character strokes of the first row are linear character strokes and all of the individual character strokes of the third row are non-linear character strokes. Also, the second row includes a dot stroke, a non-linear character stroke and a linear character stroke. Accordingly, the data entry keys of the user interface are separated into differentiating groups so that a user may intuitively and quickly locate the character strokes. For the preferred embodiment 100, each linear character stroke has a substantially straight form, and each non-linear character strokes has at least one bend in its form.

In regard to the preferred embodiment 100, each individual character stroke has a corresponding Chinese name. In Chinese, the substantially horizontal component is called "heng", the substantially vertical component is called "shu", the leftward slant component is called "pie", the dot component is called "dian", the clockwise angular component is called "zhe", the rightward slant component is called "na", the counter-clockwise hook component called "zhuogou", the counter-clockwise angular component is called "zhuozhe", and the clockwise hook component is called "yougou". Also, in Chinese, the character stroke combination in the form of a box is called "kou".

Figure 4:
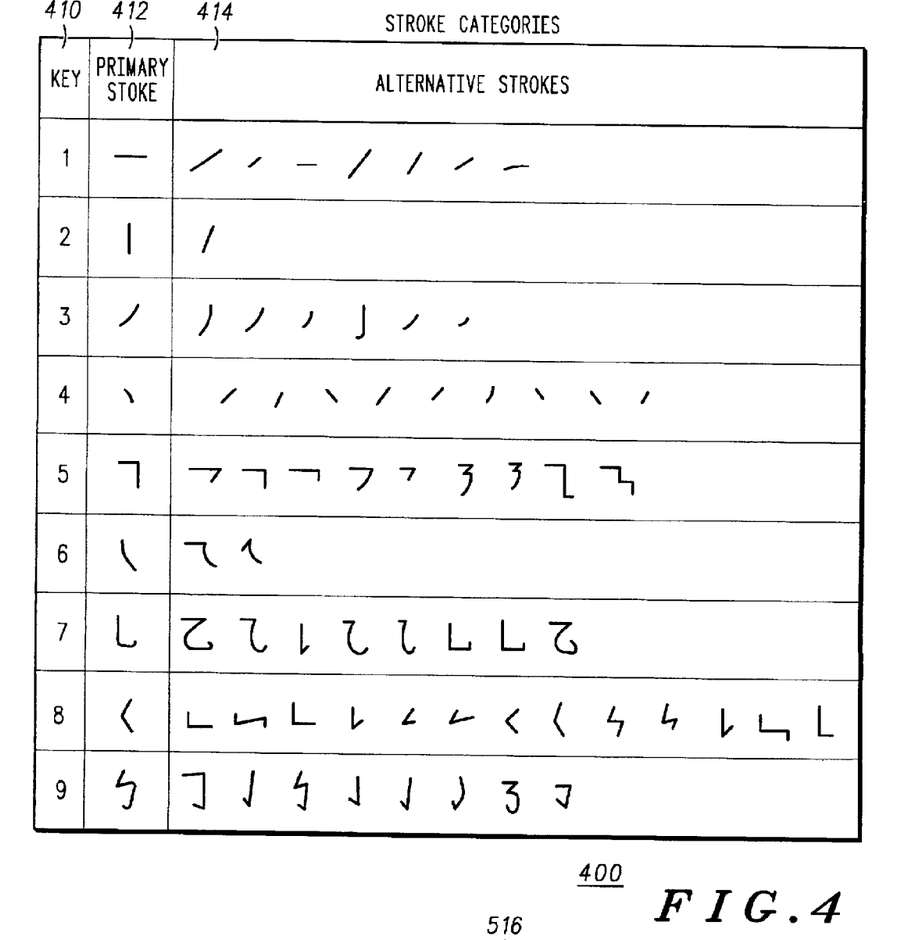
FIG. 4 is a table of stroke categories showing the character strokes of FIGS. 1 and 2 along with their equivalent alternative character strokes.

Referring to FIG. 4, there is provided a table 400 of stroke categories. Each key 410 of the keypad (shown in FIGS. 1 and 2) is assigned a plurality of strokes, namely a primary stroke 412 and at least one alternative stroke 414. The primary stroke 412 of a particular key is shown on the face of the key, whereas the alternative stroke(s) 414 for the particular key are not shown on the face of the key. Each alternative stroke 414 is a variation of its corresponding primary stroke 412 and, thus, may be interchanged with the corresponding primary stroke. Accordingly, the primary and alternative strokes 412, 414 represent the same character stroke. The best stroke, whether primary or alternative 412, 414, for a particular character stroke would be determined based on the proper appearance the final ideographic character that is formed from the stroke. For the preferred embodiment 100, the primary strokes 412 shown in FIGS. 1, 2 and 4 are selected to represent the basic character strokes of the present invention. However, it is to be understood that a primary stroke 412 of the preferred embodiment 100 may be replaced by a corresponding alternative stroke 414 without changing the function of the present invention.

For example, as shown in FIGS. 1 and 4, key "1" has a primary stroke 412 shown on the face of the key, but seven alternative strokes 414 may also represent this character stroke. As shown in FIG. 4, key "2" has the least number of alternative strokes 414, i.e. one alternative stroke, and key "8" has the most number of alternative strokes, i.e. thirteen alternative strokes. Thus, there are two ways to display the substantially vertical component on the display when key "2" is selected, and there are fourteen ways to display the counter-clockwise angular component when key "8" is selected.

Figure 5:
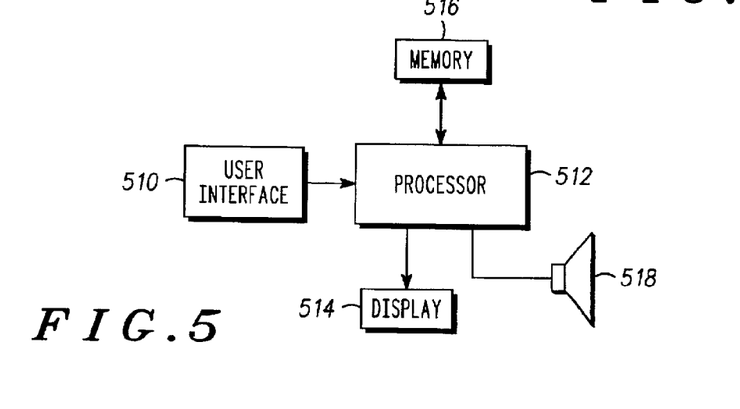
FIG. 5 is a block diagram of the internal electronic components of the preferred embodiment of FIG. 1.

Referring to FIG. 5, the portable electronic device of the preferred embodiment 100 includes a user interface 510, a processor 512, a display 514, and a memory portion 516. Optionally, the device may include an audio output device 518. The processor 512 receives data input signals from the user interface 510 and processes theses signals to generate ideographic characters or portions thereof on the display 514. The memory portion 516 includes volatile memory and non-volatile memory. The non-volatile memory includes tables of character strokes and ideographic characters, such as the stroke categories table shown in FIG. 4. The processor 512 may utilize the volatile memory as general workspace for performing its calculations and functions.

Ideographic portions are subsets of ideographic characters that are formed from character strokes. Although one or more character strokes may be used to identify a simple ideographic character, a complex ideographic character may be formed in steps. For example, a group of character strokes may be processed by the processor 512 to form an ideographic portion, such as an upper part of an ideographic character. When the processor 512 receives another group of character strokes, the processor 512 is able to formulate the rest of the ideographic character. Accordingly, character strokes are converted directly into simple ideographic characters but, for complex ideographic characters, character strokes are converted to ideographic portions before forming the ideographic characters.

It is important to note that the character stroke combination, such as the box component, is formed from a particular sequence of single stroke keys. Thus, for the preferred embodiment 100, activation of key "0" is a shortcut that produces the same result as activation of the key "2", key "5" and key "1" in that particular sequence. The preferred embodiment 100 utilizes the box component due to its common usage in Asian languages. However, the present invention is not limited to usage of the box component and is directed to other character stroke combination that may be useful to a user.

Figure 6A:
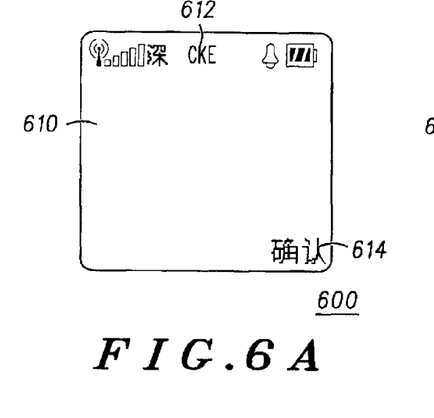
FIGS. 6A through 6E are screen views of preferred embodiment of FIG. 1 demonstrating use of a combination stroke key.

FIGS. 6A through 6E show a first example 600 representing input using a character stroke combination. FIG. 6A shows an initial blank screen 610 that indicates a Chinese character input mode ("CKE") 612 at the top of the screen and a "confirm" function 614 when the right menu selection key 134 is actuated. Of course, since the screen 610 is blank, actuation of the right menu selection key 134 would not produce any results.

Figure 6B:
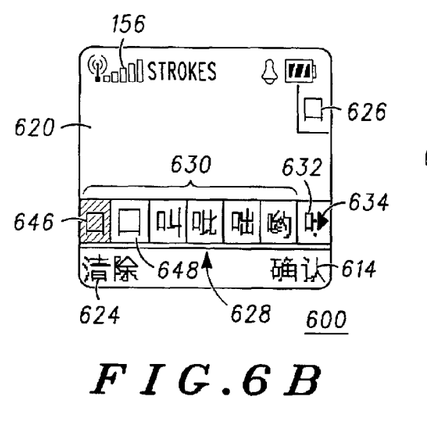

FIG. 6B shows a second screen 620 that appears after key "0" is actuated. The screen 620 indicates that the device has entered a "Strokes" mode 622 in which the processor 512 is processing the received input for ideographic character candidates. In addition to the "confirm" function 614 corresponding to the right menu selection key 134, a "clear" or "delete" function 624 now corresponds to the left menu selection key 130, as represented by the equivalent Chinese character at the lower left-hand corner of the screen 620. The entered character stroke combination 626 is shown at the upper right-hand corner of the screen 620 (beneath the power indicator), and a list of candidates 628 is shown at the bottom of the screen (above the menu selection indicators). Hypothetically, if there were only one possible candidate, then that particular ideographic character would be shown on the screen 620 beneath the signal strength indicator 156. For this first example, more than six candidates have been identified by the processor 512, so six candidates 630 are shown alone with a portion of the seventh candidate 632 along with an arrow 634 to indicate that there are more than six candidates.

Also, for the preferred embodiment 100, the most likely desired candidates are provided first at the left-hand side 646 of the list of candidates 628 and the remaining candidates are provided to the right of that candidate in decreasing order of desirability. Desirability is based on frequency of use, either by a predetermined table stored in memory 516 or by an adaptive table stored in memory and modified by the processor 512 using artificial intelligence technologies to "learn" the usage tendencies of the user. As shown in FIG. 6B, the left-most character 646 is highlighted on the screen 620, and selection the right direction key 136 of the function keys 126 will highlight the next candidate 648 to the right. Highlighting the right-most candidate, i.e. the seventh candidate 632 and the arrow 634 shown in FIG. 6B, will result in scrolling the list of candidates 628 to the right so that the left-most character(s) will no longer appear.

Figure 6C:
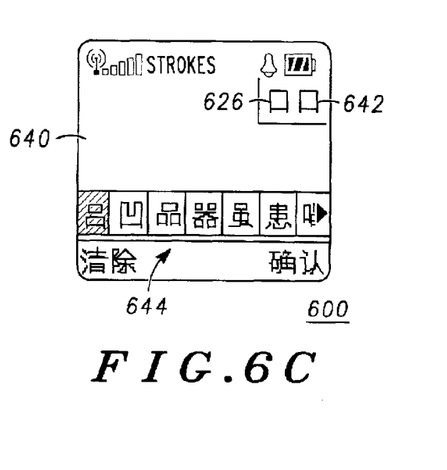

FIG. 6C shows a third screen 640 that appears after key "0" is actuated a second time. This second entry 642 of the character stroke combination is shown at the upper right-hand corner of the screen 640 next to the first entry 626, and a new list of candidates 644 is shown at the bottom of the screen. For this example, the processor 512 has identified a list of candidates 644 having at least two box components 626, 642 in their ideographic characters, which is either a refined version of the previous list 628 or a whole new list created by the processor.

Figure 6D:
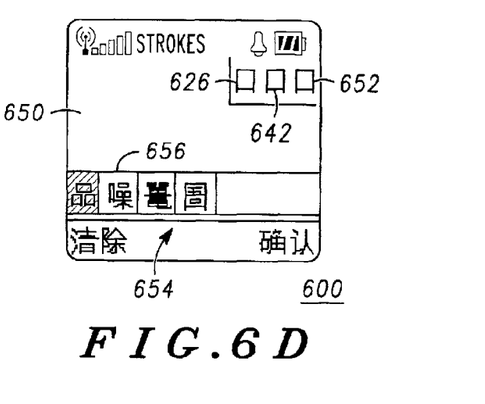

FIG. 6D shows a fourth screen 650 that appears after key "0" is actuated a third time. This third entry 652 of the character stroke combination is shown at the upper right-hand corner of the screen 650 next to the first and second entries 626, 642, and a new list of candidates 654 is shown at the bottom of the screen. For this example, the processor 512 has identified a list of candidates 654 having at least three box components 626, 642, 652 in their ideographic characters. As can be seen in FIG. 6D, the list of candidates 654 has decreased to include just four candidates.

Figure 6E:
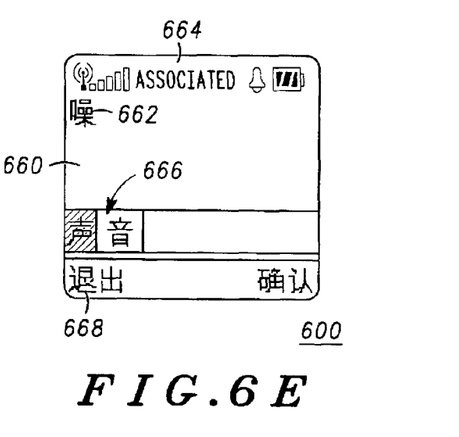

FIG. 6E shows a fifth screen 660 that appears after key "0" is actuated a fourth time. This fourth entry of the character stroke combination is not shown at the upper right-hand corner of the screen, since the selection of four box components would only result in one ideographic character candidate 662. Incidentally, this same result would have occurred if, at the previous screen 650, the user had actuated the right direction key 136 and the right menu selection key 134 to select the second candidate 656 in the list 654. Also, the screen 660 has changed to indicate that the device has entered an "Associated" mode 664 in which the processor 512 predicts the next candidate following the ideographic character 662 shown. Accordingly, a new list of associated candidates 666 is provided at the bottom of the screen 660 (above the menu selection indicators). Also, replacing the "clear" or "delete" function corresponding to the left menu selection key 130, the left menu selection key activates an "exit" function 668 as represented by the equivalent Chinese character at the lower left-hand corner of the screen.

Figure 7A:
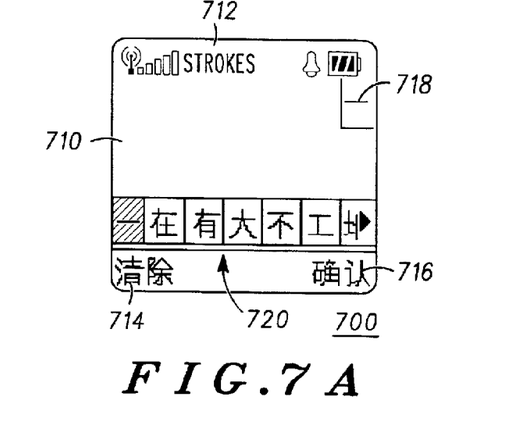
FIGS. 7A through 7C are screen views of the preferred embodiment of FIG. 1 demonstrating use the combination stroke key with single stroke keys.
Figure 7B:
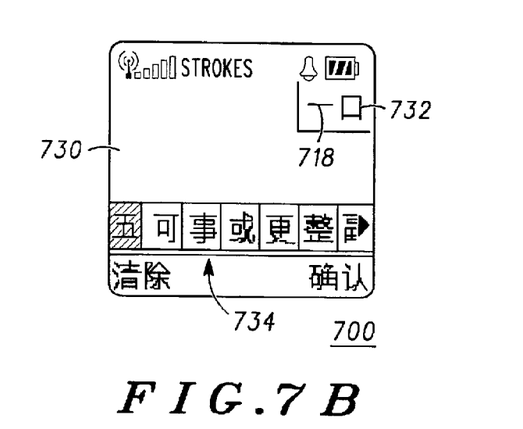
Figure 7C:
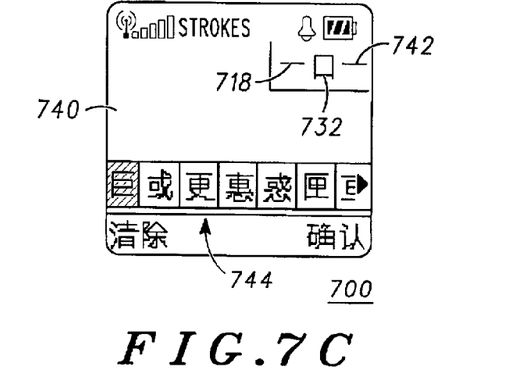

FIGS. 7A through 7C show a second example 700 representing input using a character stroke combination. In contrast to the first example 600 above in which a series of character stroke combination are input in succession, this second example 700 enters a combination of individual character strokes and character stroke combination.

FIG. 7A shows a screen 710, for this second example 700, that may follow the initial blank screen 610 of FIG. 6A when key "1" is actuated. The screen 710 indicates that the device has entered a "Strokes" mode 712, and the left and right menu selection keys are capable of activating a "clear" or "delete" function 714 and a "confirm" function 716, respectively. The entered individual character stroke 718, namely the substantially horizontal component, is shown at the upper right-hand corner of the screen 710 (beneath the power indicator), and a list of candidates 720 is shown at the bottom of the screen (above the menu selection indicators).

FIG. 7B shows a second screen 730, for this second example 700, that appears after key "0" is actuated following the screen shown 710 in FIG. 7A. This second entry 732 is shown at the upper right-hand corner of the screen 730 next to the first entry 718, and a new list of candidates 734 is shown at the bottom of the screen. For this example, the processor 512 has identified a list of candidates 734 having a substantially horizontal component 718 and a box component 732 in their ideographic characters. For the preferred embodiment 100, the list 734 is composed of any ideographic characters that would be generally composed by writing a substantially horizontal component 718 first and, then, writing a box component 732. Since ideographic characters are generally written form top-to-bottom and left-to-right, the processor 512 of the preferred embodiment 100 would select ideographic characters having a substantially horizontal component 718 above a box component 732.

FIG. 7C shows a third screen 740, for this second example 700, that appears after key "1" is actuated following the screen 730 shown in FIG. 7B. In other words, the user has selected key "1", then key "0", and finally key "1". This third entry 742 of the character stroke combination is shown at the upper right-hand corner of the screen 740 next to the first and second entries 718, 732, and a new list of candidates 744 is shown at the bottom of the screen. For the preferred embodiment 100, the list 744 is composed of any ideographic characters that would be generally composed by writing a substantially horizontal component 718 first and, then writing a box component 732, and finally another substantially horizontal component 742. Thus, the processor 512 of the preferred embodiment 100 would select ideographic characters having a substantially horizontal component 718 above a box component 732 and another substantially horizontal component 742 below the box component. To continue, the user may enter another individual or character stroke combination at the data entry keys 128, or activate one of the menu selection keys 130, 132, 134 to select a corresponding function.

Figure 8A:
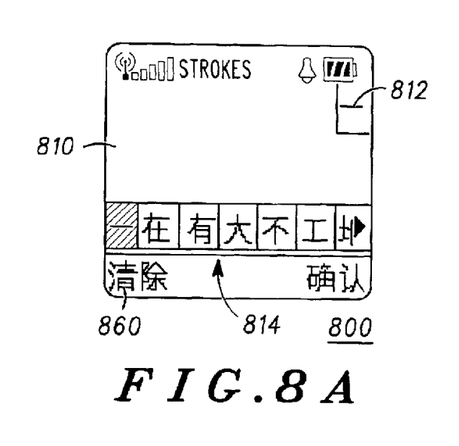
FIGS. 8A through 8E are screen views of the preferred embodiment of FIG. 1 demonstrating use of single stroke keys to achieve the result of the combination stroke key (without using the combination stroke key).
Figure 8B:
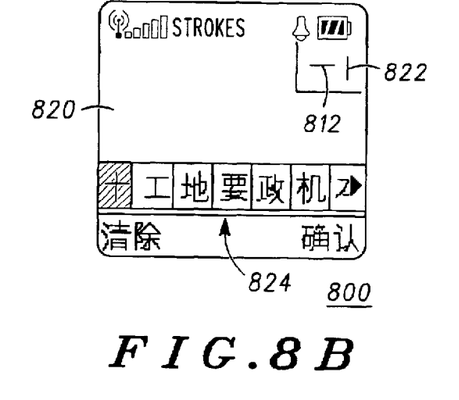
Figure 8C:
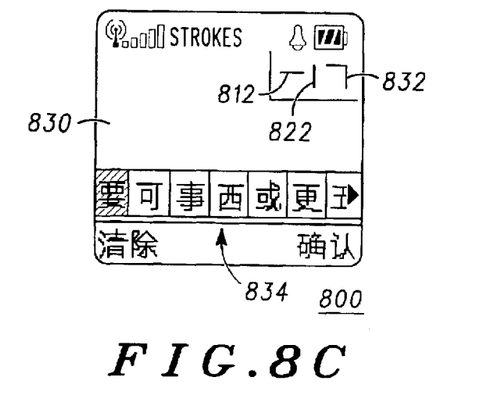
Figure 8D:
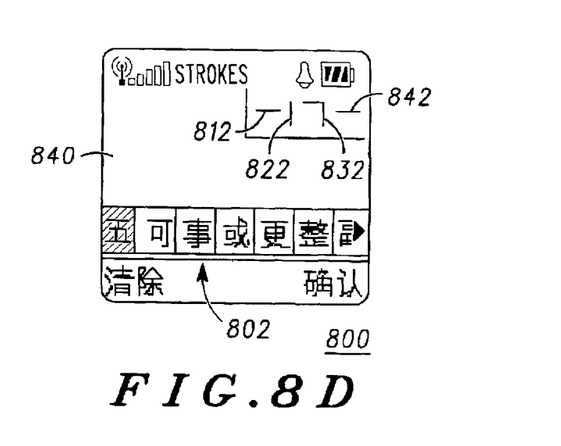
Figure 8E:
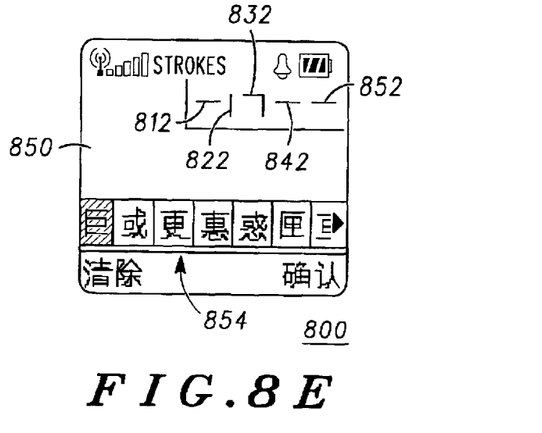

FIGS. 8A through 8E show a third example 800 representing input using individual character strokes instead of character stroke combination. FIG. 8A is identical to FIG. 7A, and FIG. 8E is substantially identical to FIG. 7C. However, FIGS. 8B through 8D show a three-step process that produces the same resulting list of candidates 802 as the list of candidates 734 resulting from the one-step process shown in FIG. 7B. Accordingly, FIGS. 8A through 8E demonstrate that, although ideographic characters may be identified by the preferred embodiment 100 without using character stroke combinations, character stroke combinations significantly reduce the number of activation required by the user to produce a particular ideographic character.

FIG. 8A shows a screen 810, for this third example 800, that may follow the initial blank screen 610 of FIG. 6A when key "1" is actuated. The entered individual character stroke 812, namely the substantially horizontal component, is shown at the upper right-hand corner of the screen 810, and a list of candidates 814 is shown at the bottom of the screen. FIGS. 8B through 8D show a second, third and fourth screens 820, 830, 840 that appears after the data entry keys 128 are actuated in the following order: first key "2", then key "5", and finally key "1". These three entries 822, 832, 842 are shown at the upper right-hand corner of the screen 840 next to the first entry 812, and a new list of candidates 824, 834, 802 is shown at the bottom of each respective screen 820, 830, 840. The list of candidates 802 shown in FIG. 8D is identical to the list of candidates 734 shown in FIG. 7B. FIG. 8E shows a fifth screen 850 that appears after key "1" is actuated following the screen 840 shown in FIG. 8D. Accordingly, character stroke combinations assist a user to generate the same results as certain individual character strokes using few key activations.

The "clear" or "delete" function 624, 714, 860 assigned to the left menu selection key 130, as shown in FIGS. 6A through 6E, FIGS. 7A through 7C, and FIGS. 8A through 8E, may serve undo key activations by the user. For example, if a user activates the left menu selection key 130 when the screen 850 shows the layout of FIG. 8E, then the screen 840 will show the layout of FIG. 8D. After that, activation of the left menu selection key 130 again would cause the screen 830 to show the layout of FIG. 8C, and so on. In other words, selection of the "clear" or "delete" function would undo the user's most recent action.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A user interface for a portable electronic device comprising a first row of input keys, a second row of input keys adjacent to the first row, arid a third row of input keys adjacent to the second row, wherein each key of the first row represents a linear character stroke, each key of the third row represents a non-linear character stroke, and the second row includes at least one key representing a linear characters stroke and at least one key representing a non-linear character stroke.

2. The user interface of claim 1, wherein the second row includes at least one key representing a dot.

3. The user interface of claim 1, wherein said angular character strokes include a clockwise hook component a counter-clock wise hook component, a clockwise angular component, and a counter-clockwise angular component.

4. The user interface of claim 3, wherein:
the clockwise hook component includes a substantially downward line having an end portion that hooks to the left;
the counter-clockwise hook component includes a substantially downward line having an end portion that hooks to the right;
the clockwise angular component includes a substantially rightward line having an end portion that angles downward; and
the counter-clockwise angular component includes a substantially downward line having an end portion that angles to the right.

5. The user interface of claim 1, wherein said linear character strokes include a substantially horizontal component, a substantially vertical component, a leftward slant component, and a rightward slant component.

6. The user interface of claim 5, wherein:
the substantially horizontal component is directed rightward;
the substantially vertical component is directed downward;
the leftward slant component is directed downward and to the left; and
the rightward slant component is directed downward and to the right.

7. A user interface for a portable electronic device comprising:
a group of nine input keys representing numbers 1 through 9, wherein;
each key of input key 1, input key 2 and input key 3 represents a single linear character stroke; and
each of input key 7, input key 8 and input key 9 represents a non-linear character stroke.

8. The user interface of claim 7, wherein input key 4 represents a dot.

9. The user interface of claim 7, wherein input key 5 represents a non-linear character stroke.

10. The user interface of claim 7, wherein input key 6 also represents a linear character stroke.

11. The user interface of claim 7, wherein the group of nine input keys are arranged in three rows and three columns to form a three-by-three matrix of input keys.

* * * * *